United States Patent
Kuruganti et al.

(10) Patent No.: US 9,053,136 B2
(45) Date of Patent: Jun. 9, 2015

(54) SYSTEMS AND METHODS FOR IDENTIFYING CONTACTS AS USERS OF A MULTI-TENANT DATABASE AND APPLICATION SYSTEM

(75) Inventors: Aditya Kuruganti, San Francisco, CA (US); Sanjaya Lai, South San Francisco, CA (US); Samatha Sanikommu, Dublin, CA (US); David Knight, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 538 days.

(21) Appl. No.: 12/985,972

(22) Filed: Jan. 6, 2011

(65) Prior Publication Data

US 2011/0238760 A1    Sep. 29, 2011

Related U.S. Application Data

(60) Provisional application No. 61/318,207, filed on Mar. 26, 2010.

(51) Int. Cl.
  *G06F 15/16* (2006.01)
  *G06F 17/30* (2006.01)
(52) U.S. Cl.
  CPC ............................... *G06F 17/30306* (2013.01)
(58) Field of Classification Search
  USPC ........... 709/209; 726/2, 21, 36; 380/255, 264, 380/276; 713/150, 163, 181
  See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |

(Continued)

FOREIGN PATENT DOCUMENTS

EP    2116954    * 11/2009

*Primary Examiner* — Jason K. Gee
*Assistant Examiner* — Sharif E Ullah
(74) *Attorney, Agent, or Firm* — Ingrassia Fisher & Lorenz, P.C.

(57) ABSTRACT

A system and method of identifying users of a multi-tenant database and application service is provided. The system and method is configured to generate a list of contacts from a contact database of a multi-tenant database and application service. Each contact in the list of contacts is sent a message that includes a link to web site that includes a query. Specifically, each contact visiting the web site is queried to determine if the contact is a user of a multi-tenant database and application service. Additionally, contacts are queried to determine if they are an administrator user, and if not, who is an associated administrator user. The contact database is updated to indicate contacts that are users of the multi-tenant database and application service when approved of by the associated administrator.

20 Claims, 10 Drawing Sheets

(56) References Cited

U.S. PATENT DOCUMENTS

| | | |
|---|---|---|
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 7,698,160 B2 | 4/2010 | Beaven et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0233404 A1 | 12/2003 | Hopkins |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0210909 A1 | 10/2004 | Dominquez, Jr. et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0065925 A1 | 3/2005 | Weissman et al. |
| 2005/0091098 A1 | 4/2005 | Brodersen et al. |
| 2005/0223022 A1 | 10/2005 | Weissman et al. |
| 2005/0283478 A1 | 12/2005 | Choi et al. |
| 2006/0206834 A1 | 9/2006 | Fisher et al. |
| 2008/0275884 A1* | 11/2008 | Yoshida et al. ............ 707/10 |
| 2008/0287180 A1* | 11/2008 | Hutchinson-Kay ......... 463/20 |
| 2009/0030906 A1* | 1/2009 | Doshi et al. ............... 707/9 |
| 2009/0049053 A1* | 2/2009 | Barker et al. ............. 707/10 |
| 2011/0282833 A1* | 11/2011 | Ramsey et al. ........... 707/609 |
| 2012/0042013 A1* | 2/2012 | Roman et al. ............ 709/204 |

* cited by examiner

SYSTEMS AND METHODS FOR IDENTIFYING CONTACTS AS USERS OF A MULTI-TENANT DATABASE AND APPLICATION SYSTEM

CROSS-REFERENCE TO RELATED APPLICATION(S)

This application claims the benefit of U.S. provisional patent application Ser. No. 61/318,207, filed Mar. 26, 2010, the entire content of which is incorporated by reference herein.

TECHNICAL FIELD

The following relates to data processing systems and processes, and more particularly relates to systems and processes for collecting performance data for multiple tenants in a multi-tenant database system environment.

BACKGROUND

Modern software development is evolving away from the client-server model toward "cloud"-based processing systems that provide access to data and services via the Internet or other networks. In contrast to prior systems that hosted networked applications on dedicated server hardware, the cloud computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant platforms can facilitate effective collaboration between users, including between users in different tenants. For example, between a salesperson in one company and a purchasing manager in another company. However, for this to occur, it is generally required that such other users in other be identified. Because data is generally kept confidential from other tenants, there has been no effective way to identify users in other tenants for the purpose of collaboration. This has limited the effectiveness of the collaboration between users in such systems.

DESCRIPTION OF THE DRAWING FIGURES

Exemplary embodiments will hereinafter be described in conjunction with the following drawing figures, wherein like numerals denote like elements.

DETAILED DESCRIPTION

According to various exemplary embodiments, systems and methods are provided to effectively identify contacts as users of a multi-tenant database system. This facilitates improved collaboration between users of different tenants in the multi-tenant system.

Figure 1:
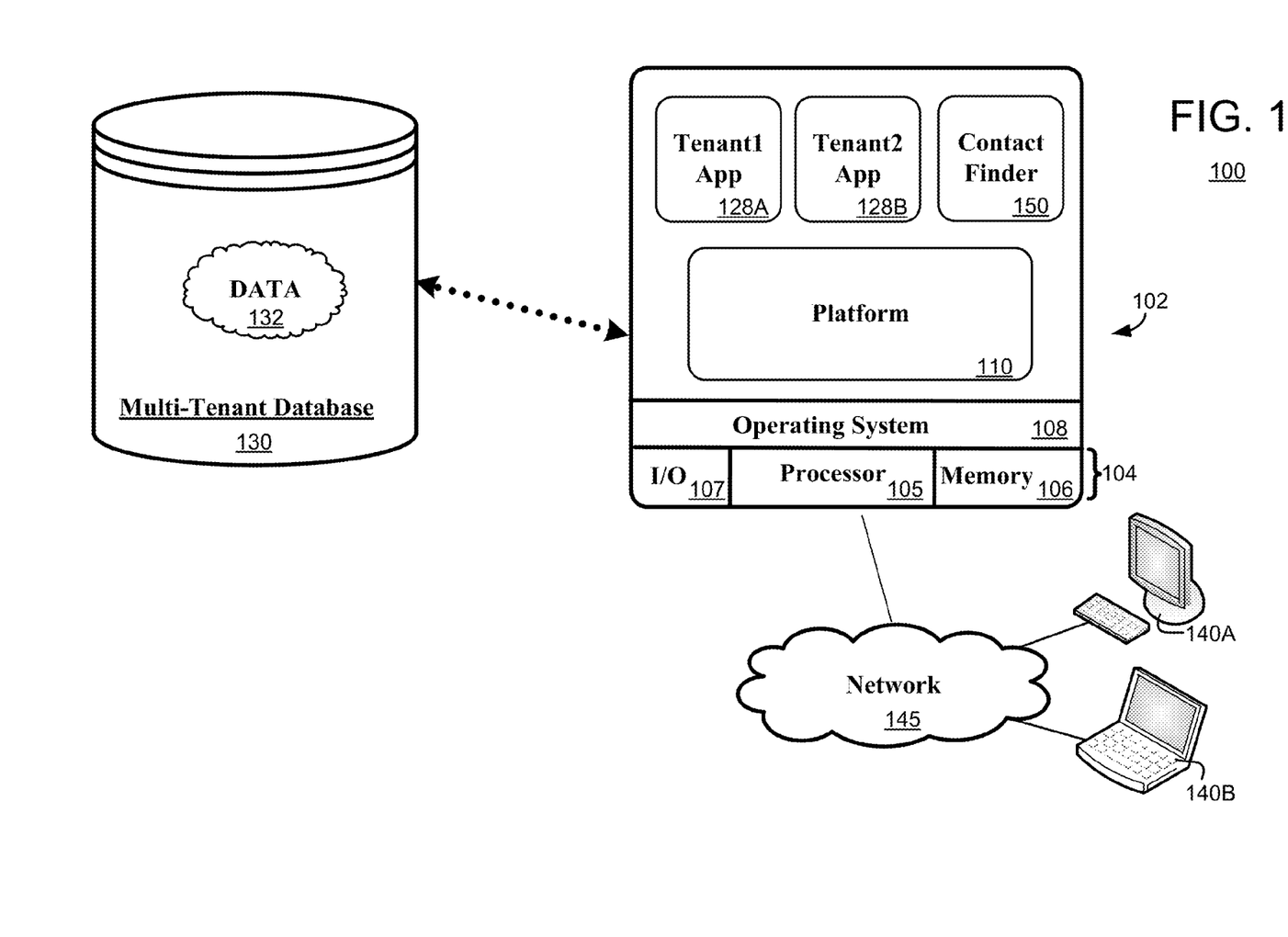
FIG. 1 is a block diagram of an exemplary multi-tenant data processing system.

Turning now to FIG. 1, an exemplary multi-tenant application system 100 suitably includes a server 102 that dynamically creates virtual applications 128A-B based upon data 132 from a common database 130 that is shared between multiple tenants. In general, "tenant" generally refers to a group of users that shares access to common data within database 130. Likewise, the server 102 may be referred to as, for example, an origin application server. Data and services generated by the virtual applications 128A-B are provided via network 145 to any number of client devices 140A-B, as desired. Each virtual application 128A-B is suitably generated at run-time using a common platform 110 that securely provides access to data 132 in database 130 for each of the various tenants subscribing to system 100.

Database 130 is any sort of repository or other data storage system capable of storing and managing data 132 associated with any number of tenants. Database 130 may be implemented using any type of conventional database server hardware. In various embodiments, database 130 shares processing hardware 104 with server 102. In other embodiments, database 130 is implemented using separate physical and/or virtual database server hardware that communicates with server 102 to perform the various functions described herein.

Server 102 is implemented using one or more actual and/or virtual computing systems that collectively provide a dynamic application platform 110 for generating virtual applications 128A-B. Server 102 operates with any sort of conventional computing hardware 104, such as any processor 105, memory 106, input/output features 107 and the like. Processor 105 may be implemented using one or more of microprocessors, microcontrollers, processing cores and/or other computing resources spread across any number of distributed or integrated systems, including any number of "cloud-based" or other virtual systems. Memory 106 represents any non-transitory short or long term storage capable of storing programming instructions for execution on processor 105, including any sort of random access memory (RAM), read only memory (ROM), flash memory, magnetic or optical mass storage, and/or the like. Input/output features 107 represent conventional interfaces to networks (e.g., to network 145, or any other local area, wide area or other network), mass storage, display devices, data entry devices and/or the like. In a typical embodiment, application platform 110 gains access to processing resources, communications interfaces and other features of hardware 104 using any sort of conventional or proprietary operating system 108. As noted above, server 102 may be implemented using a cluster of actual and/or virtual servers operating in conjunction with each other, typically in association with conventional network communications, cluster management, load balancing and other features as appropriate.

As noted above, a "tenant" generally refers to a group of users that shares access to common data within database 130. Tenants may represent customers, customer departments, business or legal organizations, and/or any other entities that maintain data for particular sets of users within system 100. Although multiple tenants may share access to a common server 102 and database 130, the particular data and services provided from server 102 to each tenant can be securely isolated from those provided to other tenants, as described more fully below. The multi-tenant architecture therefore allows different sets of users to share functionality without necessarily sharing each other's data 132.

However, it should be noted that because the data 132 for different tenants is securely isolated, there has been in the past no easy way for users in one tenant to identify users in another tenant. Instead, such information is considered confidential and is thus isolated from other tenants. To overcome this, the multi-tenant application system 100, and in particular, the server 102, includes a contact finder 150 for identifying users of the multi-tenant application system 100. Contact finder 150 allows users to of the multi-tenant application system 100 to identify those contacts in other tenants as other users of the multi-tenant application system 100. Furthermore, contact finder 150 may facilitate the making of connections between identified contacts when approved by an appropriate administrator.

In one embodiment, contact finder 150 is configured to generate a list of contacts from a contact database. This contact database may reside in the database 130, and is thus accessible through server 102. When instructed, contact finder 150 sends each contact in the list of contacts a message, where the message is designed to query the contact to determine if the contact is also a user of the multi-tenant application system 100. This message may be sent as an email from server 102, or using any other suitable mechanism.

In one embodiment, the messages include a link to web site that includes the queries. Such an embodiment allows for customization of the queries that are provided to each contact. For example, each contact visiting the web site may be queried to determine if the contact is a user of a multi-tenant database and application service. Additionally, contacts may be queried to determine if they are an administrator user, and if not, who is an associated administrator user. When such information is provided, contact finder 150 updates the contact database to indicate contacts that are users of the multi-tenant application system 100. In some embodiments, such updates are made only when approved by an administrator user of the multi-tenant application system 100. This allows the administrator user to maintain control over connections to other users. Such embodiments may also update the contact database newly identified administrator users.

Figure 2:
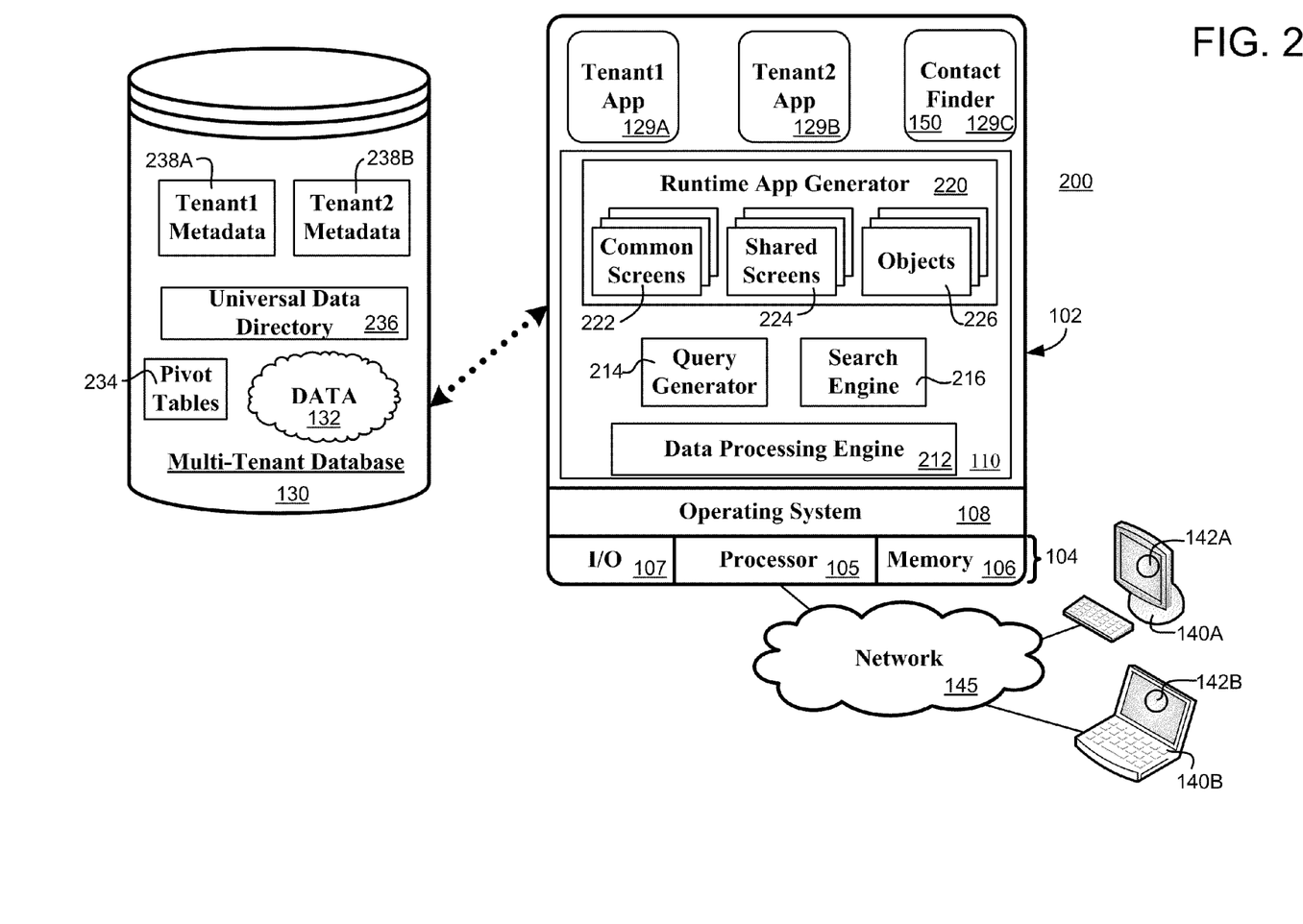
FIG. 2 is a block diagram of another exemplary multi-tenant data processing system.

FIG. 2 illustrates another exemplary multi-tenant application system 200 in accordance with an embodiment. The multi-tenant application system 200 includes client devices 140A-B. The multi-tenant application system 200 further includes a server 102 that dynamically creates virtual applications 129A-C based upon data 132 from a common database 130 that is shared between multiple tenants. Data and services generated by the virtual applications 129A-C are provided via network 145 to any number of client devices 140A-B, as desired. Each virtual application 129A-C is suitably generated at run-time using a common platform 110 that securely provides access to data 132 in database 130 for each of the various tenants subscribing to system 100.

In this illustrated embodiment the virtual application 129C comprises a contact finder 150 virtual application for identifying users of the multi-tenant application system 200. Contact finder 150 allow users to of the multi-tenant application system 200 to identify those contacts in other tenants as other users of the multi-tenant application system 200. Furthermore, contact finder 150 may facilitate the making of connections between identified contacts when approved by an appropriate administrator.

Data 132 may be organized and formatted in any manner to support multi-tenant application platform 110. In various embodiments, data 132 is suitably organized into a relatively small number of large data tables to maintain a semi-amorphous "heap"-type format. Data 132 can then be organized as needed for a particular virtual application 129A-C. In various embodiments, conventional data relationships are established using any number of pivot tables 234 that establish indexing, uniqueness, relationships between entities, and/or other aspects of conventional database organization as desired.

Further data manipulation and report formatting is generally performed at run-time using a variety of meta-data constructs. Metadata within a universal data directory (UDD) 236, for example, can be used to describe any number of forms, reports, workflows, user access privileges, business logic and other constructs that are common to multiple tenants. Tenant-specific formatting, functions and other constructs may be maintained as tenant-specific metadata 238A-B for each tenant, as desired. Rather than forcing data 132 into an inflexible global structure that is common to all tenants and applications, then, database 130 is organized to be relatively amorphous, with tables 234 and metadata 236-238 providing additional structure on an as-needed basis. To that end, application platform 110 suitably uses tables 234 and/or metadata 236, 238 to generate "virtual" components of applications 129A-C to logically obtain, process, and present the relatively amorphous data 132 from database 130.

Application platform 110 is any sort of software application or other data processing engine that generates virtual applications 129A-C that provide data and/or services to client devices 140A-B. Virtual applications 129A-C are typically generated at run-time in response to queries received from client devices 140A-B. In the example illustrated in FIG. 2, application platform 110 includes a bulk data processing engine 212, a query generator 214, a search engine 216 that provides text indexing and other search functionality, and a runtime application generator 220. Each of these features may be implemented as a separate process or other module, and many equivalent embodiments could include different and/or additional features, components or other modules as desired.

Runtime application generator 220 dynamically builds and executes virtual applications 129A-C in response to specific requests received from client devices 140A-B. Virtual applications 129A-C created by tenants are typically constructed in accordance with tenant-specific metadata 238, which describes the particular tables, reports, interfaces and/or other features of the particular application. In various embodiments, each virtual application 129A-C generates dynamic web content that can be served to a browser or other client program 142A-B associated with client device 140A-B, as appropriate.

Application generator 220 suitably interacts with query generator 214 to efficiently obtain multi-tenant data 132 from database 130 as needed. In a typical embodiment, query generator 214 considers the identity of the user requesting a particular function, and then builds and executes queries to database 130 using system-wide metadata 236, tenant specific metadata 238, pivot tables 234 and/or any other available resources. Query generator 214 in this example therefore maintains security of the multi-tenant database 130 by ensuring that queries are consistent with access privileges granted to the user that initiated the request.

Data processing engine 212 performs bulk processing operations on data 132 such as uploads or downloads, updates, online transaction processing and/or the like. In many embodiments, less urgent bulk processing of data 132 can be scheduled to occur as processing resources become available, thereby giving priority to more urgent data processing by query generator 214, search engine 216, virtual applications 129A-C and/or the like. Again, the various components, modules and inter-relationships of other application platforms 120 may vary from the particular examples described herein.

In operation, then, developers use application platform 110 to create data-driven virtual applications 129A-C for the tenants that they support. Such applications 129A-C may make use of interface features such as tenant-specific screens 224, universal screens 222 or the like. Any number of tenant-specific and/or universal objects 226 may also be available for integration into tenant-developed applications 129A-C. Data 132 associated with each application 129A-C is provided to database 130, as appropriate, and stored until requested, along with metadata 138 that describes the particular features (e.g., reports, tables, functions, etc.) of tenant-specific application 129A-C until needed.

Data and services provided by server 102 can be retrieved using any sort of personal computer, mobile telephone, tablet or other network-enabled client device 140 on network 145. Typically, the user operates a conventional browser or other client program 242 to contact server 102 via network 145 using, for example, the hypertext transport protocol (HTTP) or the like. The user typically authenticates his or her identity to the server 102 to obtain a session identification ("SessionID") that identifies the user in subsequent communications with server 102. When the identified user requests access to a virtual application 129A-C, application generator 220 suitably creates the application at run time based upon metadata 236 and 238, as appropriate. Query generator 214 suitably obtains the requested data 132 from database 130 as needed to populate the tables, reports or other features of virtual application 129A-C. As noted above, the virtual application 129A-C may contain Java, ActiveX or other content that can be presented using conventional client software 142A-B running on client device 140A-B; other embodiments may simply provide dynamic web or other content that can be presented and viewed by the user, as desired.

As noted above, in the illustrated embodiment, one of the virtual applications 129A-C comprises a connection finder 150 virtual application. Contact finder 150 accesses a contact database in the common database 130. Using any number of client devices 140A-B, users may access contact finder 150 and the contact database via network 145. Again, the common platform 10 provides secure access to contact database in database 130 for each of the various tenants subscribing to system 100.

Contact finder 150 may be generated at run-time in response to queries received from client devices 140A-B. Each of the features of contact finder 150 may be implemented as a separate process or other module, and many equivalent embodiments could include different and/or additional features, components or other modules as desired. For example, runtime application generator 220 may be used to dynamically build and execute contact finder 150 in response to specific requests received from client devices 140A-B. Such building may be in accordance with tenant-specific metadata 238, which describes the particular tables, reports, interfaces and/or other features of the particular application. In some embodiments, the contact finder 150 may be configured to generate dynamic web content that can be served to a browser or other client program 142A-B associated with client device 140A-B, as appropriate.

In this embodiment, contact finder 150 and associated data and services may be utilized with any sort of personal computer, mobile telephone, tablet or other network-enabled client device 140 on network 145. Typically, the user operates a conventional browser or other client program 242 to contact server 102 via network 145 using, for example, the hypertext transport protocol (HTTP) or the like. When an identified user requests access to contact finder 150, application generator 220 suitably creates the application at run time based upon metadata 236 and 238, as appropriate. Query generator 214 suitably obtains the requested data 132 (such as the contact database) from database 130 as needed by contact finder 150. As noted above, contact finder 150 may contain Java, ActiveX or other content that can be presented using conventional client software 142A-B running on client device 140A-B; other embodiments may simply provide dynamic web or other content that can be presented and viewed by the user, as desired.

In one embodiment, the contact finder 150 maybe selectively enabled or disabled by an administrator. Additionally, administrators may be given various levels of control over when and how users may initiate contact finding. When enabled and initiated by a user, contact finder 150 accesses the contact database to generate a list of contacts. A variety of tools may be provided to select which contacts in the contact database are added to the list of contacts. Contact finder 150 further provides a mechanism to send contact in the list of contacts a message, where the message is designed to query the contact to determine if the contact is also a user of the multi-tenant application system 200. This message may be sent as an email from server 102 through network 145, or using any other suitable mechanism.

In one embodiment, the messages include a link to web site that includes the queries for each contact. Such a web site may be hosted with the server 102, but other servers may also provide the web site. Using a web site to implement the query allows for customization of the queries that are provided to each contact. For example, by providing the dynamically created contact using Java, Active X, or other suitable mechanisms.

In one embodiment, each contact visiting the web site may be queried to determine if the contact is a user of a multi-tenant application system 200. Additionally, contacts may be queried to determine if they are an administrator user, and if not, who is an associated administrator user. When such information is provided, contact finder 150 updates the contact database in database 130 to indicate contacts that are users of the multi-tenant application system 200. In some embodiments, such updates are made only when approved by an administrator user. This allows the administrator user to maintain control over connections to other users. Such embodiments may also update the contact database newly identified administrator users.

Figure 3:
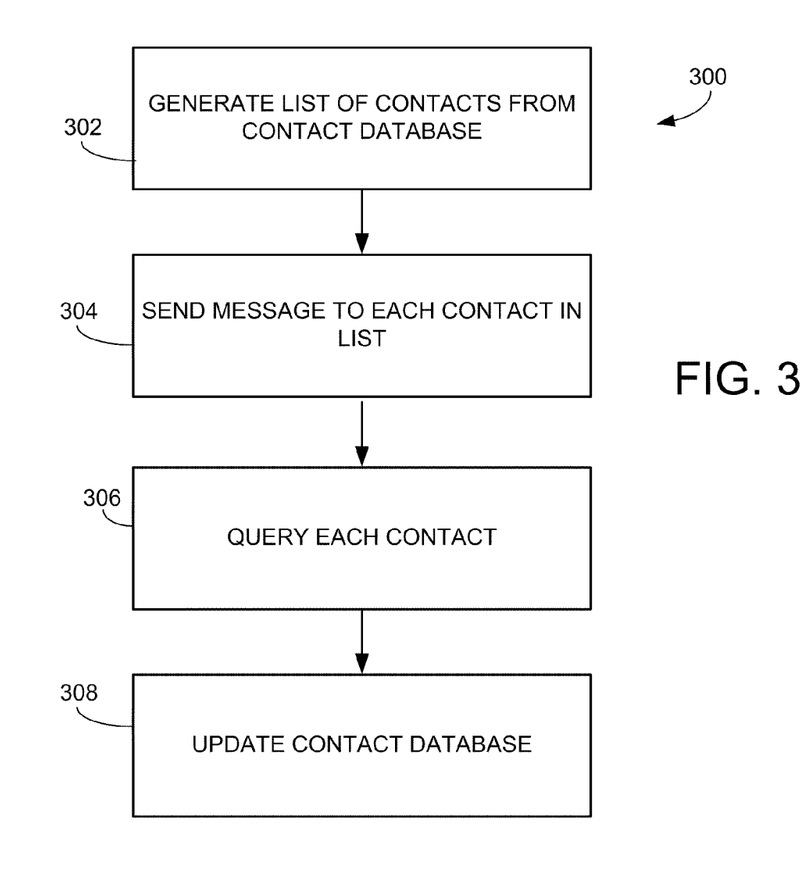
FIG. 3 is a flow chart illustrating an exemplary method of identifying users of a multi-tenant database and application service.

Turning now to FIG. 3, a method 300 for identifying contacts that use a multi-tenant database and application service is illustrated. The method 300 will be illustrated using exemplary interfaces 400-1000 illustrated in FIGS. 4-10.

The first step 302 of method 300 is to generate a list of contacts from the contact database. Users may wish to select contacts based on a variety of different criteria. For example, by selecting contacts by association, geography, type, etc. Additionally, users may wish to individually select contacts. A wide variety of interfaces may be provided to assist the user in selecting the contacts from the contact database. Furthermore, in generating such a contact last it may be desirable to create one or more status fields associated with each contact that is selected. Additionally, other fields may also be created, such as those identifying account objects related to the selected contacts.

Figure 4:
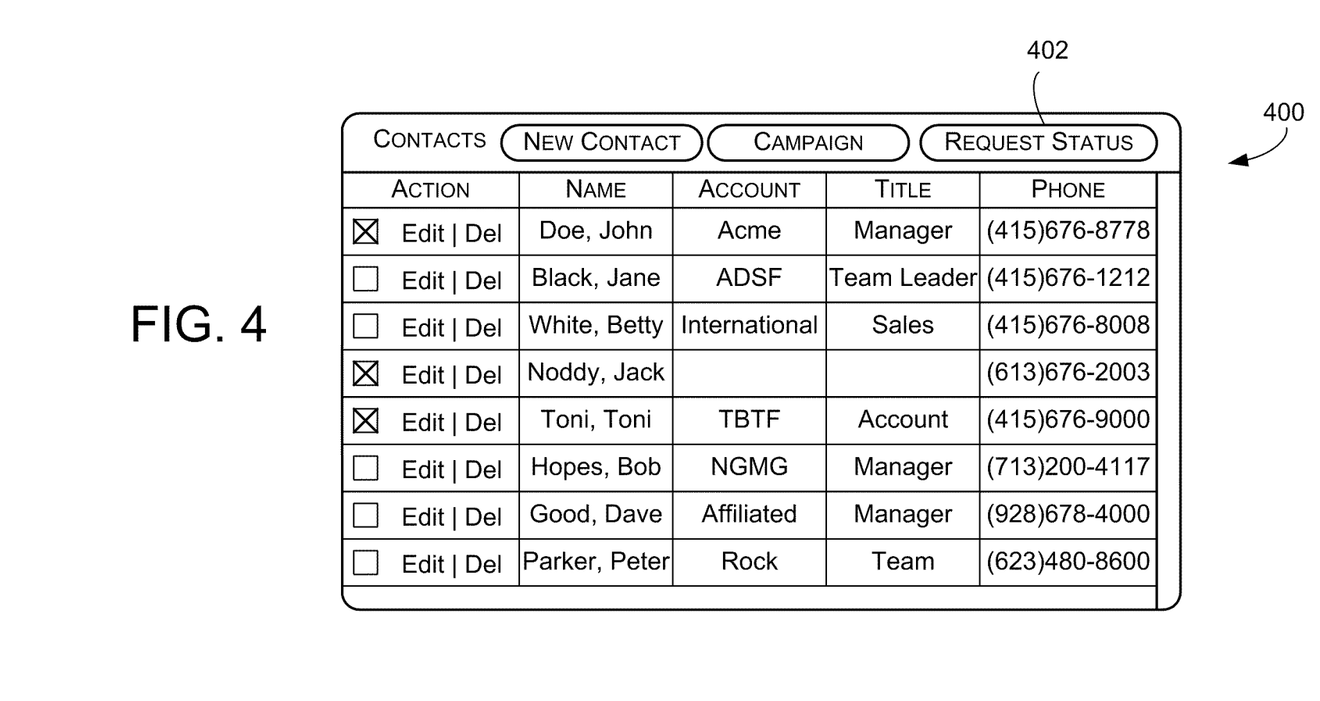
FIGS. 4-10 are exemplary interfaces for an exemplary method of identifying users in a multi-tenant database and application service.
Figure 5:
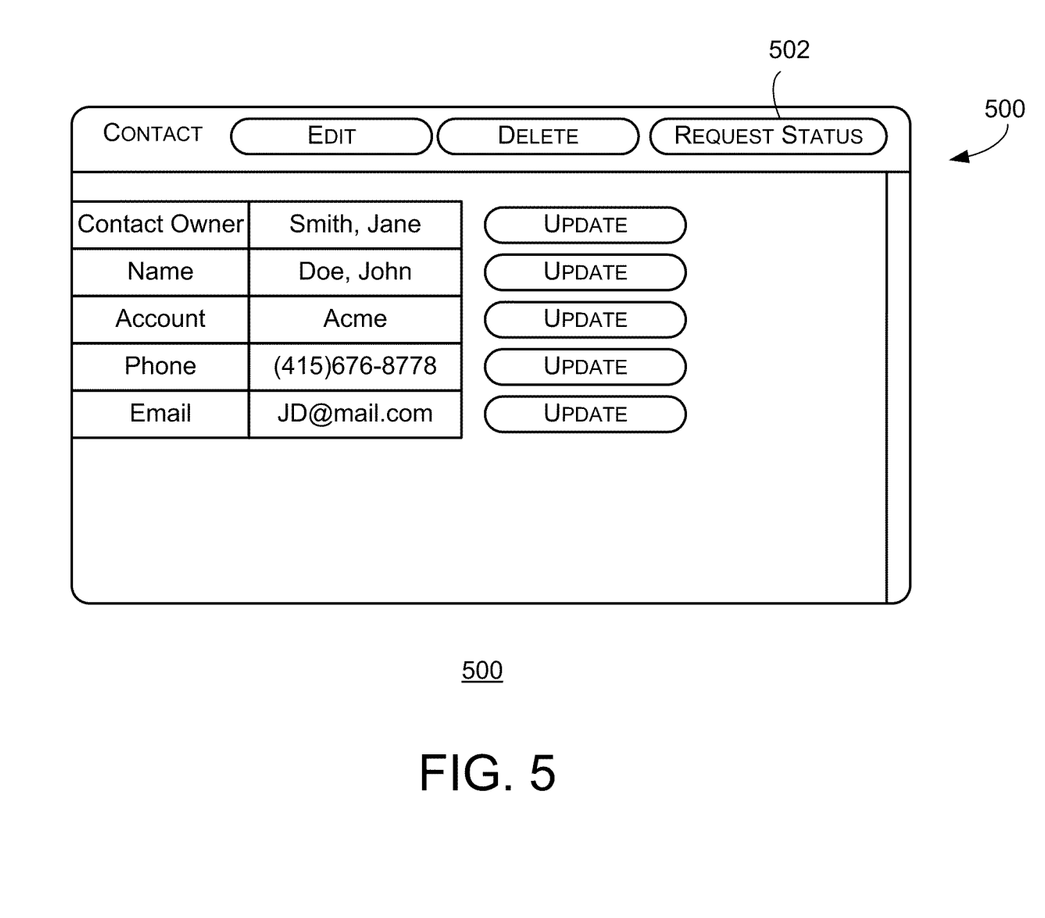

Turning now to FIG. 4, an exemplary user interface 400 is illustrated showing how a "Request Status" button 402 may be implemented in contact database user interface. To use such a device, one or more contacts would be selected by the user, and the "Request Status" button 402 would initiate contact finding for each of the selected contacts. Turning to FIG. 5, a second exemplary user interface 500 is illustrated showing a "Request Status" button 502 that may be implemented on an individual contact entry for selected contact. Such an implementation would allow a user to request information from individual contacts at any time, and thus may be used to send queries to selected individuals as the need arises.

Returning to FIG. 3, the next step 304 is to send a message to each contact in the list. The message 304 facilitates a query of each of contact in the contact list. Again, the messages may be sent in any suitable format and over any suitable network. In one embodiment step 304 is facilitated by providing one or more email templates that are selectable by the user. In some cases, it may be desirable to allow the administrator to select which of a variety of email templates are provided to which users of the multi-tenant application system. These email templates may include formatting, logos, and other elements are desirable. Any suitable mechanism may be used to prepare and send the message. For example, various mail merge processes may be used to generate individual messages from the contact list.

In one embodiment, each email includes a "link", such as a uniform resource locator (URL) to a web site where the contact is queried. It is generally desirable to designate the link in the template to ensure that the proper links to the web site are provided. In this case, the link would typically be set dynamically by the system or administrator.

Figure 6:
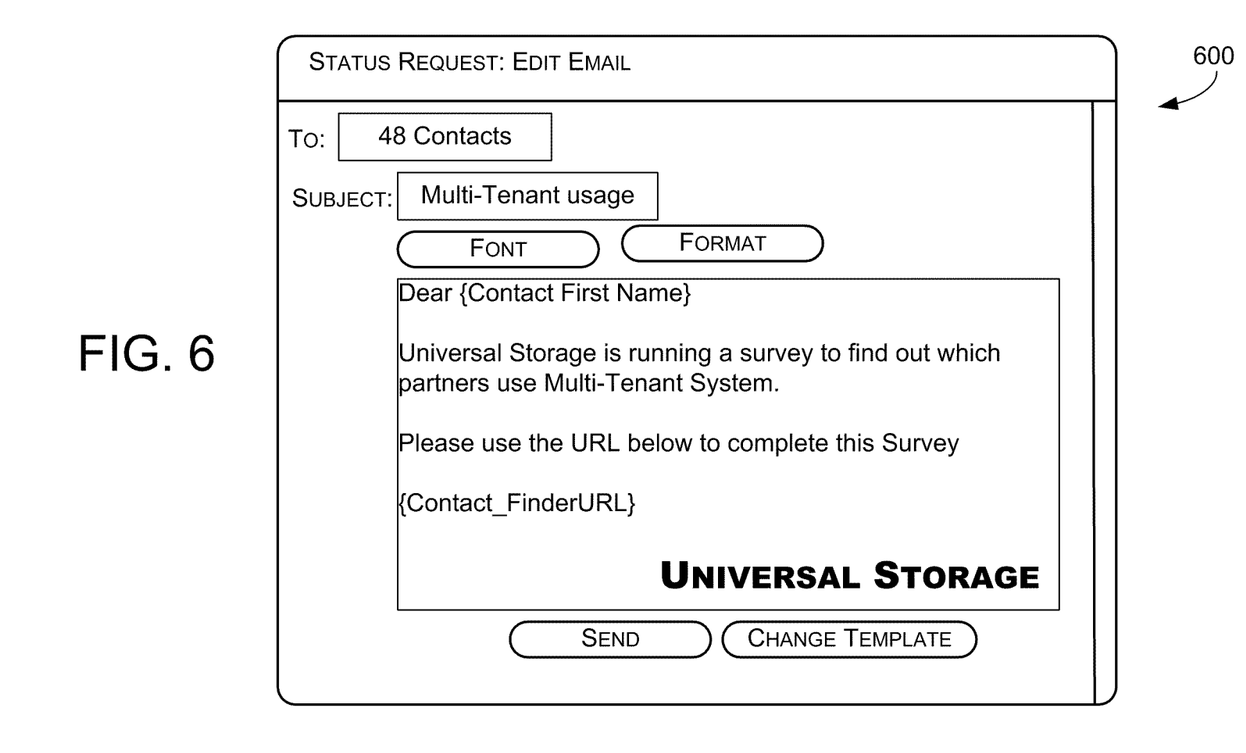
Figure 7:
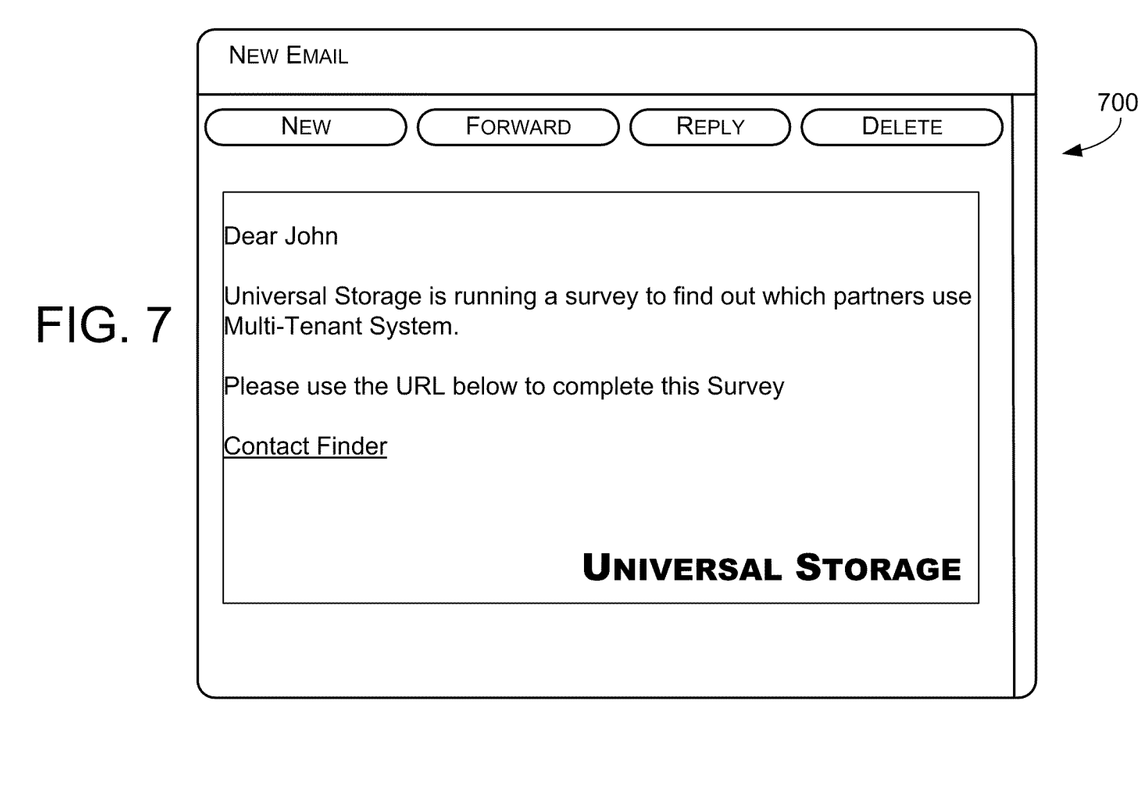

Turning to FIG. 6, a third exemplary user interface 600 is illustrated showing how the contact finder can provide an email template to the user. In this illustrated example, the user may edit the subject and text of the email, while the link and a company logo are provided by the system. Turning now to FIG. 7, an exemplary email generated from the email template of FIG. 6 is shown in user interface 700.

Returning now to FIG. 3, the next step 306 is to query each contact regarding multi-tenant application status. For example, when the contact accesses the web site indicated by the link, where the web site is generated to include one or more queries. As described above, such a web site may be dynamically created using any suitable tool. In one embodiment, each contact is queried to determine if the contact is a user of a multi-tenant database and application service. Additionally, contacts may be queried to determine if they are an administrator user, and if not, who is an associated administrator user. In some embodiments other features may be included. For example, the web site may provide multiple language options.

Figure 8:
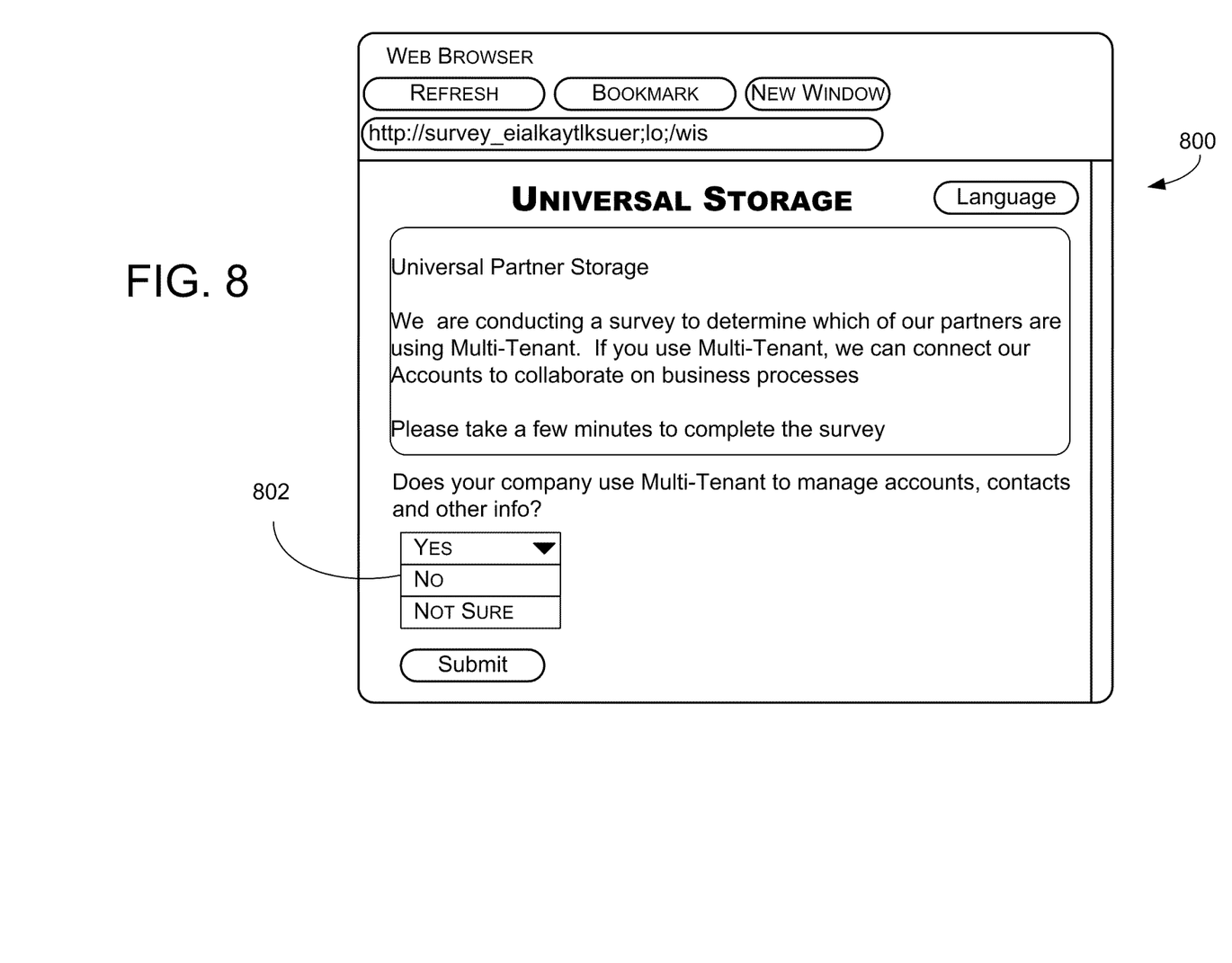
Figure 9:
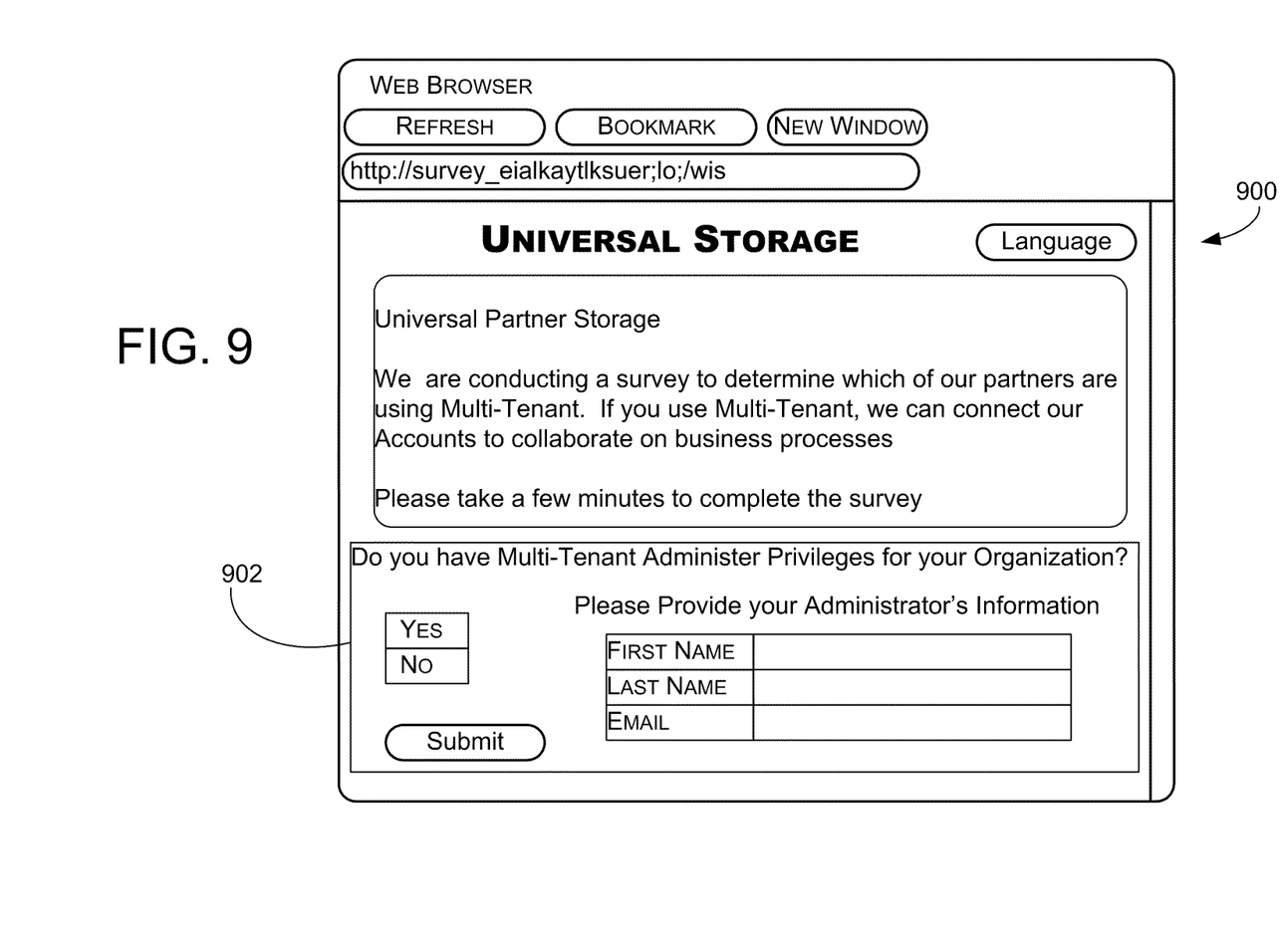

Turning to FIG. 8, an exemplary user interface 800 is illustrated showing a web site that includes one or more queries. In this example, the web site provides a drop down menu 802 for a user to answer if they are a user of the multi-tenant application system. Note also that this example provides a company logo and other identifying information to the contact visiting the web site. Turning now to FIG. 9, an exemplary user interface 900 is illustrated showing follow up questions regarding administrator user rights for the system. In this example, various data entry elements 902 are included in the user interface 900. These data entry elements 902 allow the contact to identify themselves as an administrator, or alternatively, to identify another person as the administrator.

In other embodiments further information may be provided in the web site, such as links to other web sites that introduce or explain the multi-tenant application system to potential new users. Such information can include how the multi-tenant application system may facilitate a variety of business related actions.

Returning to FIG. 3, the next step 308 is to update the contact database. This generally involves updating the contact database with information regarding their status, including identifying information regarding their associated tenants, administrator users, and other data specific to the multi-tenant database and application. In some embodiments fields will be added or updated to the contact database to store information regarding the contacts use of the multi-tenant system. These fields may be made to include the same access control safeguards as other potentially confidential data in the system. Additionally, some new features may be added, such as a "Forward to Connections" feature that allows easy messaging to all or select groups of contacts that have been identified as users of the multi-tenant application system. Finally, the system may also be configured to provide various reports as to how contacts are responding to the queries.

In some applications it will be desirable to only provide such updating when approved by the administrator user of the system. For example, to control when and how other contacts may identify and link with other tenants in the system. In these embodiments the system may validate that a contact claiming to be an administrator user is one, or validate that the identified administrator user is correct.

Figure 10:
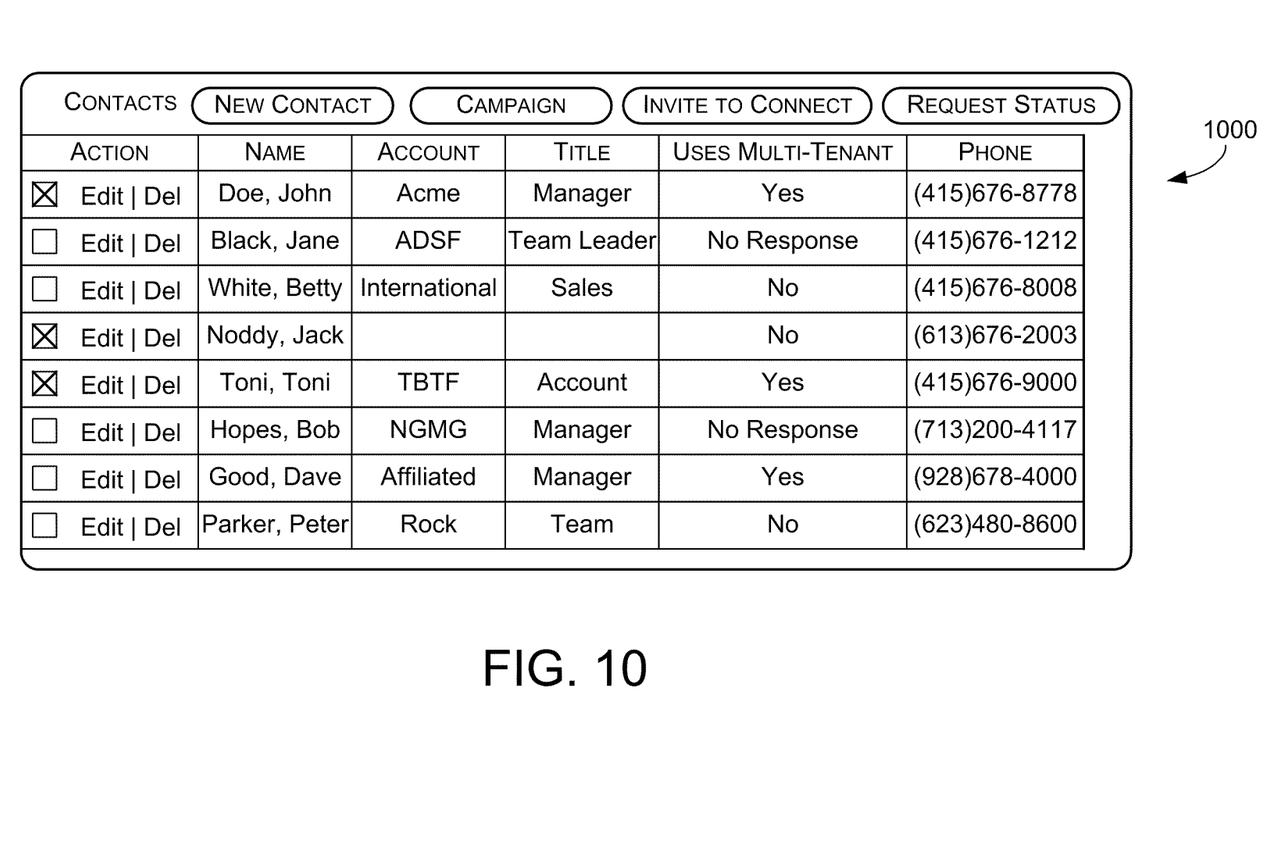

Turning now to FIG. 10, an exemplary user interface 1000 is illustrated. Interface 1000 shows how the contacts database has been updated to identify which users have responded, and which have been identified as being users of the multi-tenant application system.

Generally speaking, the various functions and features of method 300 may be carried out with any sort of hardware, software and/or firmware logic that is stored and/or executed on any platform. Some or all of method 300 may be carried out, for example, by logic executing within system 100 in FIG. 1. For example, various functions shown in FIG. 3 may be implemented using software or firmware logic that is stored in memory 106 and executed by processor 105 as part of application platform 110. The particular hardware, software and/or firmware logic that implements any of the various functions shown in FIG. 3, however, may vary from context to context, implementation to implementation, and embodiment to embodiment in accordance with the various features, structures and environments set forth herein. The particular means used to implement each of the various functions shown in FIG. 3, then, could be any sort of processing structures that are capable of executing software and/or firmware logic in any format, and/or any sort of application-specific or general purpose hardware, including any sort of discrete and/or integrated circuitry.

The term "exemplary" is used herein to represent one example, instance or illustration that may have any number of alternates. Any implementation described herein as "exemplary" should not necessarily be construed as preferred or advantageous over other implementations.

Although several exemplary embodiments have been presented in the foregoing description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A system comprising:
a memory; and a server communicatively connected to the memory, the server providing a multi-tenant database and application service, the server configured to:

generate a list of contacts of a particular tenant of the multi-tenant database;

send a message to each contact of the particular tenant in the list of contacts for the particular tenant, the message including an inquiry to participate in a query as to whether the contact of the particular tenant is also a tenant of the multi-tenant database and application service, wherein the query is facilitated by the message, and wherein the contact of the particular tenant participates in the query by providing, in response to the message, information as to whether the contact is also a tenant of the multi-tenant database;

query each contact of the particular tenant responding to the message via the query to determine, based on the information provided by the contact via the contact's participation in the query in response to the message, if the contact of the particular tenant represents another tenant of the multi-tenant database and application service; and update the list of contacts for the particular client to indicate contacts of the particular tenant that have been determined to represent tenants of the multi-tenant database and application service based on the query.

2. The system of claim 1 wherein the message to each contact includes a link to a web site, the web site configured to perform the query of each contact responding to the message by visiting the web site.

3. The system of claim 1 wherein the server is further configured to query each contact responding to the message to determine if the contact is an administrator user of the multi-tenant database and application service.

4. The system of claim 1 wherein the server is further configured to query each contact responding to the message to determine an associated administrator user of the multi-tenant database and application service.

5. The system of claim 1 wherein the server is further configured to seek permission from an associated administrator user to update the contact database for users that are not administrator users.

6. The system of claim 1 wherein the server is further configured to generate a new contact for an associated administrator user to update the contact database for users that are not administrator users.

7. The system of claim 1 wherein the server is configured to generate the list of contacts from the contact database.

8. A method for identifying contacts that use a multi-tenant database and application service, comprising:

generating a list of contacts of a particular tenant of the multi-tenant database;

sending a message to each contact of the particular tenant in the list of contacts, the message including an inquiry to participate in a query as to whether the contact of the particular tenant is also a tenant of the multi-tenant database and application service, wherein the query is facilitated by the message, and wherein the contact of the particular tenant participates in the query by providing, in response to the message, information as to whether the contact is also a tenant of the multi-tenant database;

querying each contact of the particular tenant responding to the message via the query to determine, based on the information provided by the contact via the contact's participation in the query in response to the message, if the contact of the particular tenant represents another tenant of the multi-tenant database and application; and updating the list of contacts for the particular client to indicate contacts of the particular client that have been determined to represent tenants of the multi-tenant database and application service based on the query.

9. The method of claim 8 wherein the message to each contact includes a link to a web site, the web site configured to perform the query of each contact responding to the message by visiting the web site.

10. The method of claim 8 further comprising the step of querying each contact responding to the message to determine if the contact is an administrator user of the multi-tenant database and application service.

11. The method of claim 8 further comprising the step of querying each contact to determine an associated administrator user of the multi-tenant database and application service.

12. The method of claim 8 further comprising the step of seeking permission from an associated administrator user to update the contact database for users that are not administrator users.

13. The method of claim 8 further comprising the step of generating a new contact for an associated administrator user to update the contact database for users that are not administrator users.

14. The method of claim 8 wherein the step of generating the list of contacts comprises generating the list of contacts from the contact database.

15. A multi-tenant database system comprising:

a memory; and a server communicatively connected to the memory, the server providing a multi-tenant database and application service, the server configured to:

generate a list of contacts of a particular tenant of the multi-tenant database from a contact database for the particular tenant in the multi-tenant database and application service;

send a message to each contact in the list of contacts for the particular tenant, the message including a link to a first web site, the message including an inquiry to participate in a query as to whether the contact of the particular tenant is also a tenant of the multi-tenant database and application service, wherein the query is facilitated by the message, and wherein the contact of the particular tenant participates in the query by providing, in response to the message, information as to whether the contact is also a tenant of the multi-tenant database;

query each contact for the particular tenant visiting the first web site via the query to determine, based on the information provided by the contact via the contact's participation in the query in response to the message:

if the contact of the particular tenant represents another tenant of the multi-tenant database and application;

if the contact of the particular tenant is an administrator user of the multi-tenant database and application service; and an associated administrator user for contacts of the particular tenant that represent other tenants of the multi-tenant database and application service and are not administrator users; and update the contact database for the particular tenant to indicate contacts of the particular tenant that have been determined to represent other tenants of the multi-tenant database and application service based on the query.

16. The multi-tenant database system of claim 15 wherein the server is further configured to seek permission from the associated administrator user to update the contact database for users that are not administrator users.

17. The system of claim 1, wherein the server is further configured to obtain an answer from the contact as to whether the contact is a user of the multi-tenant database.

18. The system of claim 2, wherein the web site provides a drop down menu for the contact to provide an answer as to whether the contact is a user of the multi-tenant database.

19. The method of claim 8, further comprising:
   obtaining an answer from the contact as to whether the contact is a user of the multi-tenant database.

20. The system of claim 15, wherein the server is further configured to obtain an answer from the contact as to whether the contact is a user of the multi-tenant database.

\* \* \* \* \*